Sept. 28, 1943.    E. L. ALLEN ET AL    2,330,196
GUIDE FOR ENDLESS TRACKS
Filed Dec. 6, 1941    4 Sheets-Sheet 1

INVENTORS:
EDWIN L. ALLEN
HAROLD B. MUSTER
BY Hyde and Meyer
ATTORNEYS.

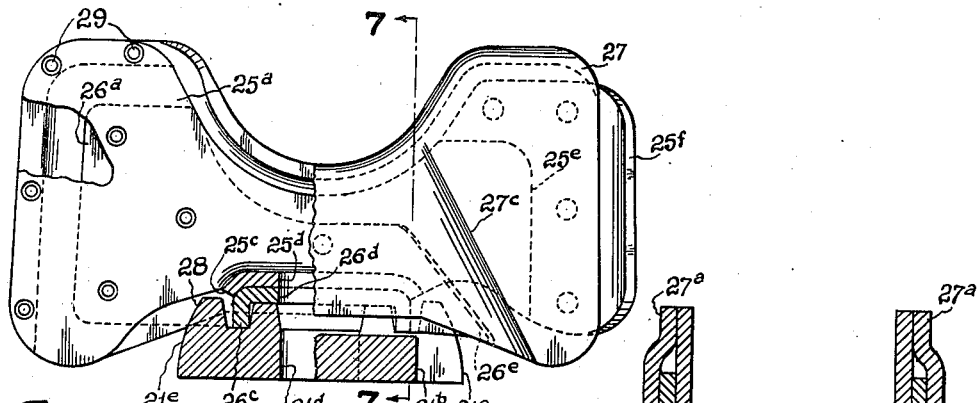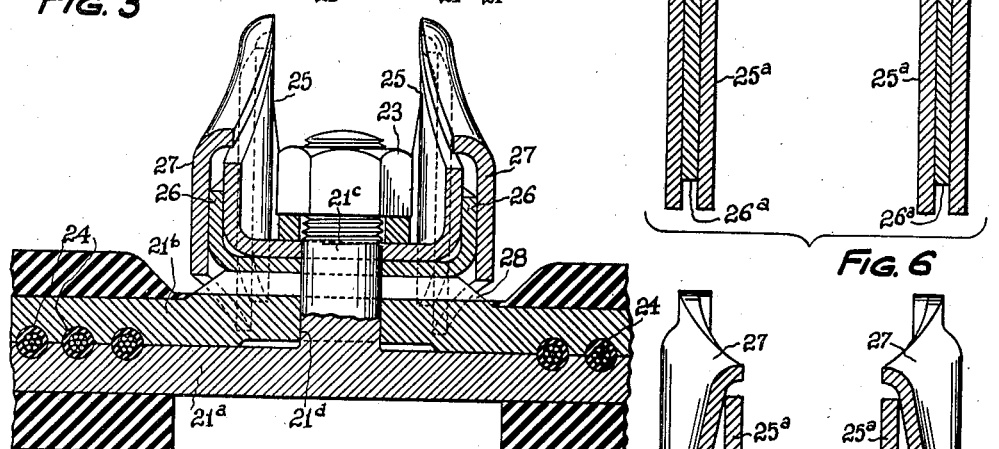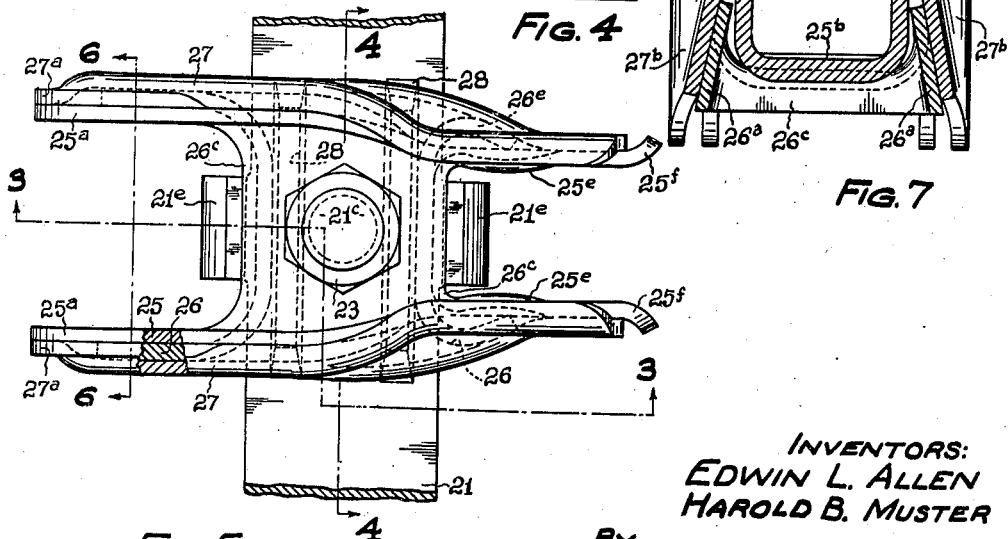

INVENTORS:
EDWIN L. ALLEN
HAROLD B. MUSTER
BY
ATTORNEYS.

Patented Sept. 28, 1943

2,330,196

UNITED STATES PATENT OFFICE 2,330,196

GUIDE FOR ENDLESS TRACKS

Edwin L. Allen and Harold B. Muster, Cleveland Heights, Ohio, assignors to Rudolph I. Schonitzer, Shaker Heights, Ohio Application December 6, 1941, Serial No. 421,892

8 Claims. (Cl. 305—10)

This invention relates to improvements in a guide especially adapted for use with a flexible endless self-laying track of a type used for tractors, trucks, tanks and the like.

This invention is an improvement of the guide disclosed and described in Patent No. 2,107,490 granted February 8, 1938, to Robert Mayne. The guide shown in this prior patent was adapted for production only by forging or casting, resulting in a number of objections and disadvantages. The production was relatively slow and costly. It was difficult to get the necessary hardness for resisting the abrasive action of sand and water encountered during the use of tracks of this type because the forging or casting had to be kept soft enough for subsequent machining operations and if treated for hardness after machining distortion would occur. Accuracy of shape and cross section and the small clearances desired could not be held within desirable limits due to the inherent characteristics of commercial forging and casting processes. Consequently vital sections of the guides were sometimes smaller than desired, thus increasing the likelihood of breakage in service. The surface of the forgings or castings was relatively uneven and rough, thus accelerating the cutting action of the abrasive materials encountered in service and leading to greater wear.

An object of the present invention is to overcome the above objectionable features and disadvantages. Our improved guide may be made of metal stampings so that the production is relatively rapid and inexpensive. Suitable hardness may be provided in the finished product because no machining is necessary after fabrication. Accuracy of shape and cross section can be held within the desired limits so that no weak sections are produced. The surface of the finished product is relatively even and smooth thus diminishing the abrasive action when the product is in service.

Another object of the present invention is to provide a novel guide member having a base plate or portion to which are secured separate outer plate members for the double purpose of reinforcing the guide member generally and to provide wearing surfaces.

Another object of the present invention is to provide a novel guide member wherein a greater number of laminations of metal stampings are provided at the wider end of the guide member than at the narrower end.

Another object of the present invention is to provide a guide member formed of a plurality of plates generally of H-form with the side portions of one plate cut off at the narrower end of the guide member so that the two plates will nest one within the other and provide reinforcing of one plate by the other at those places where the greatest strains occur.

Another object of the present invention is to provide a guide member of the type described comprising two generally parallel plates of H-form with separate side reinforcing plates.

Another object of the present invention is to provide guide members narrower at one end than at the other adapted for use with other guide members on an endless track which passes around a sprocket or the like and wherein reinforcing deformations are provided on each guide member which terminate short of the overlapping portions of adjacent guide members as they pass around the sprockets. This gives a maximum reinforcing effect without interfering with the smooth action of the guide members as they follow the endless path of the flexible track.

Other objects and advantages of the present invention will appear from the accompanying drawings and specification and the essential features thereof will be set forth in the appended claims.

In the drawings,

Fig. 3 is a view of one of our improved guide members taken approximately along the line 3—3 of Fig. 5 showing the right half in side elevation and the left half in central longitudinal section.

Fig. 4 is a central transverse section through a guide member and supporting crossbar taken along the line 4—4 of Fig. 5.

Fig. 5 is a top plan view of the device of Figs. 3 and 4.

Fig. 6 is a sectional view taken along the line 6—6 of Fig. 5.

Fig. 7 is a sectional view taken along the line 7—7 of Fig. 3.

Figure 1:
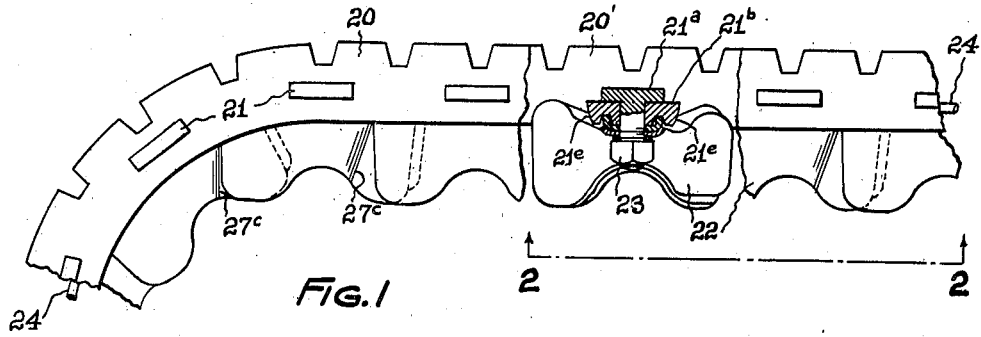
Fig. 1 is a fragmental elevational view of a portion of an endless track equipped with our improved guide members, a portion being broken away to more clearly disclose the method of attachment.
Figure 2:
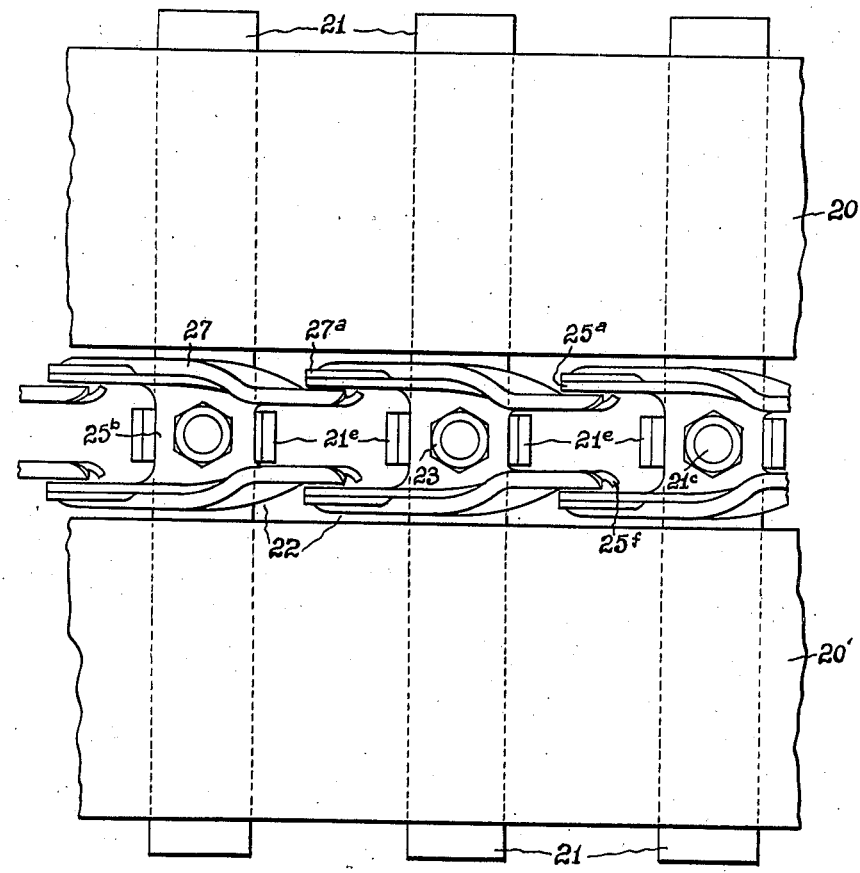
Fig. 2 is a fragmental bottom plan view somewhat enlarged of a portion of the flexible endless track of Fig. 1 and taken approximately in the position of the line 2—2.

It has not been thought necessary to illustrate more of the endless track here involved than the portions shown in Figs. 1 and 2 for the reason that the present invention is applicable to a well-known type of endless track, such as that shown in the Mayne patent referred to above. Such a track comprises parallel flexible endless bands 20 and 20' connected together by metal crossbars 21 spaced at regular intervals and preferably embedded in the rubber of the endless bands so as to form a firmly united flexible endless self-laying track. This track as shown in the above referred to patent passes over suitable idlers and beneath load bearing wheels or rollers and is generally driven by a sprocket, the teeth of which engage between the endless bands in the spaces between the crossbars 21.

The present invention relates generally to improvements in the guide members indicated generally at 22 which are attached to the crossbars in the space between the bands 20 and 20'. The purpose of these guide members is to maintain alinement of the flexible track against localized thrust tending to move portions of the track transversely to the path of track movement. Such lateral thrust occurs when the vehicle is travelling on the side of a hill or when it hits obstacles tending to thrust a portion of the track sidewards.

The track construction and the crossbars are generally of the form shown in the above mentioned Mayne patent. Each cross-bar as best seen in Fig. 4 comprises two portions 21a and 21b which are held together by any suitable means but here shown as connected by the stud 21c which extends from the portion 21a through an opening 21d in the portion 21b and all held together by the nut 23 which may also serve to clamp a guide member in position. The two portions of the crossbar clampingly engage the endless cables 24 which, as shown in the Mayne patent, form a part of the endless bands 20 and 20'. The crossbar portion 21b is preferably provided with sprocket engaging abutments 21e.

Figure 8:
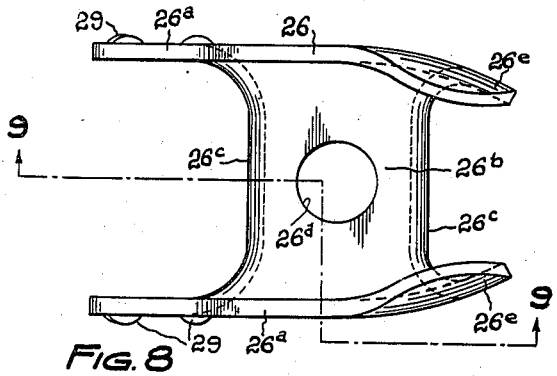
Figs. 8 to 10 show the intermediate plate member of our improved guide, Fig. 8 being a top plan view, Fig. 9 being a view taken along the line 9—9 of Fig. 8, Fig. 10 being a transverse sectional view taken on the line 10—10 of Fig. 9.
Figure 10:
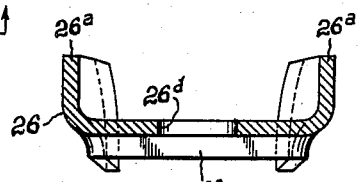
Figure 9:
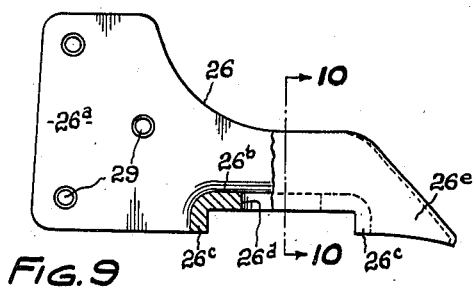
Figure 11:
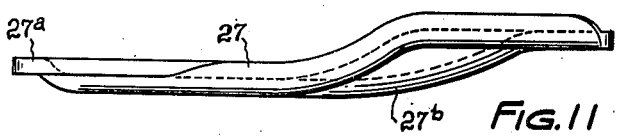
Figs. 11 to 14 are views of one of the outer plate members, Fig. 11 being a top plan view, Fig. 12 being a side elevation of the same, and Figs. 13 and 14 being sectional views along similarly numbered lines of Fig. 12.
Figure 13:
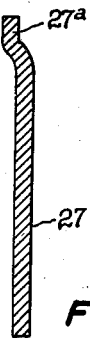

Each guide member is composed of an inner plate member 25 shown in Figs. 15 to 19, an intermediate plate member 26 shown in Figs. 8 to 10, and two outer plate members 27 shown in Figs. 11 to 14.

Figure 15:
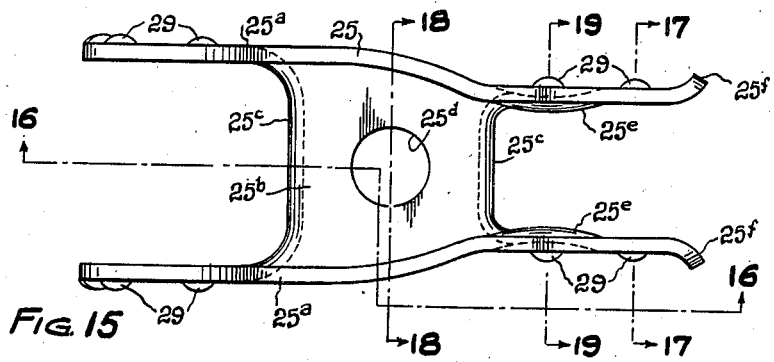
Figs. 15 to 19 are views of the inner plate member, Fig. 15 being a top plan view, Fig. 16 being a view partly in elevation and partly in section taken along the line 16—16 of Fig. 15, and Figs. 17, 18 and 19 being sectional views taken along similarly numbered lines of Fig. 15.
Figure 16:
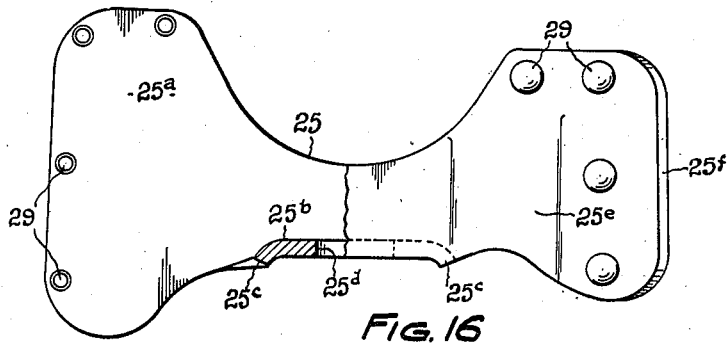
Figure 17:
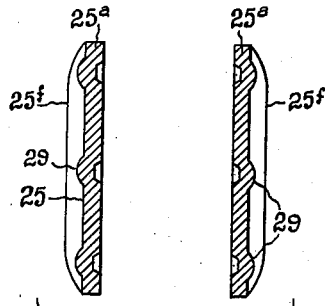
Figure 18:
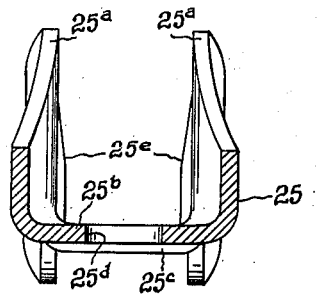
Figure 19:
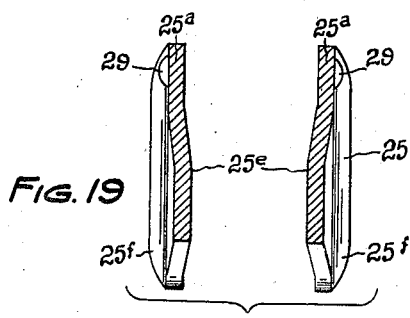

The inner plate member 25 is generally of H-form comprising two side portions 25a bent upwardly at right angles to a transverse portion 25b. The side plate portions are generally parallel to the path of movement of the endless track but are more widely spaced apart at one end than at the other, as best seen in Fig. 15. As will later appear this is so that the narrower end of one guide member may overlap and slidingly engage within the wider end of an adjacent guide member as best shown in Fig. 2. Certain of the guide members are always in engagement with the end sprockets and all of the guide members provide endless interengaging means which maintain longitudinal alinement of the straight portions of the endless track. The transverse portion 25b serves as a means of attachment of a guide member to a crossbar of the endless track as will presently appear.

The edges of the transverse portion 25b are bent downwardly as indicated at 25c to strengthen the transverse portion and to nest properly with a similar part on the member 26. A hole 25d in a transverse portion receives the stud 21c for attachment of the guide member to the crossbar. Portions 25e of the side plate portions 25a are struck inwardly to provide means for directing the guide member and a sprocket tooth into proper engagement with the abutment 21e. The outer ends 25f of the side plate portions are flared outwardly also for the purpose of providing proper cooperation between the guide member and a sprocket tooth.

The intermediate plate member 26 is also generally of H-form and comprises a plate having side portions 26a bent at substantially right angles to the transverse portion 26b. The side plate portions lie in planes generally parallel to the path of movement of the endless track and are spaced apart sufficiently that the plate member 25 may fit inside the member 26. The edges of the transverse portion 26b are bent downwardly at 26c both for the purpose of strengthening the transverse portion and to provide key means for positioning the guide member on the crossbar 21. Referring to Figs. 3, 4 and 5, key abutments 28 on the crossbar 21 are positioned to engage the key flanges 26c so that each guide member is firmly fixed on its associated crossbar. A hole 26d in the transverse portion serves to receive the stud 21c. Referring to Figs. 3, 8 and 9, it will be noted that the side plate portions 26a extend along the wider portion of the guide member and across the central portion but extend only slightly toward the narrower end of the guide member. This is for the purpose of permitting the members 26 and 25 to nest one within the other and provides greater reinforcement at the wider end of the guide member where such reinforcement is more necessary. The tongues 26e, however, extend far enough toward the narrow end of the guide member to give some reinforcing effect especially at the point where the more narrowly spaced ends of the side plate portions 25a connect with the transverse portion 25b. This is one of the weaker points and the tongues 26e provide good reinforcement at this point.

Figure 12:
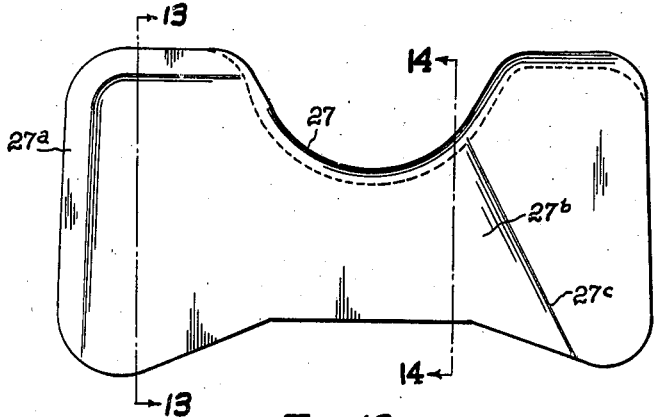
Figure 14:
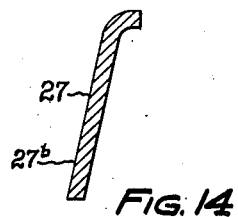

The outer plates 27 are secured on the outer sides respectively of the side plate portions 26a. Referring to Fig. 12 the upper and left end edges of the plate 27 are flanged inwardly for strengthening purposes. Also it will be noted that the left end edge and the top edge adjacent thereto have been bent inwardly and then flanged as at 27a in a plane generally parallel to the path of the flexible endless track thus providing means for attachment to the side plate portions 25a as best shown in Figs. 3 and 5. In other words this construction provides a hollow space between the plates 27 and the side plate portions 25a so as to receive the side plate portions 26a between them. Note also that the plates 27 have outwardly extending deformations 27b extending from the wider end of the guide member toward the narrower end and terminating generally along a line 27c which will be best understood by reference to Fig. 1. Here we have indicated the overlapping action between the wider and narrower ends of adjacent guide members as they pass around a sprocket (not shown). The line 27c therefore is approximately parallel to the line of overlap between the ends of adjacent guide members so as not to interfere with this overlapping action but providing reinforcement extending as far toward the narrower end of each guide member as is practical.

Any suitable means may be utilized for securing the various parts of the guide member together in their generally parallel and reinforcing relationship but preferably they are connected together by welding the projections 29. Suitable locations for these projections on the various parts have been indicated and it will be understood that the parts are assembled in proper position and then clamped under pressure while electric current is applied, whereupon the spots 29 melt and fuse into the contiguous metal, thus securing the parts together.

Because this device is formed in the manner described, namely by securing separate side plate portions 27 to an inner base member, it is possible to produce the outer side plates of different metal than that used for the base member. This may be desirable in some instances because the base member 25 or 26 serves as a means for securing the guide to the crossbar of the endless track and therefore is subjected to stresses and strains which require a strong but ductile metal. The side plate portions however can be of harder material for the purpose of standing abrasion. If such a construction is desired it is of course possible to make the base member 25 or 26, or both, of an alloy steel such as SAE 4130 which can be heat treated to a high degree of strength to withstand bending stresses. The side plates 27 may be formed of low carbon steel such as SAE 1010 which may be carburized to extreme surface hardness to stand the abrasive action to which the outside surface of the guide is subjected. It should be understood that our invention is not limited to this specific example. The example merely illustrates how our improved device may have different parts made of different materials to meet the particular conditions involved.

What we claim is:

1. A guide member for assembly on a crossbar of a flexible endless track movable in a path, said member being arranged for conjoint use with other coacting guide members of like nature, said member comprising two plates, each generally of H-form and having side portions bent up from a transverse portion into planes generally parallel to said path, one of said plates having side portions and a transverse portion generally parallel to and engaging similar parts of the other of said plates, and two separate side plate members, one secured to each of said side portions of one of said plates, said side plate members being adapted to overlap and engage similar portions of an adjacent guide member on the endless track.

2. A guide member for assembly on a crossbar of a flexible endless track movable in a path and passing over a rotatable track supporting member, said guide member being arranged for conjoint use with other coacting guide members of like nature, said guide member comprising side plate portions generally parallel to said path and means for connecting the same to the track, said side plate portions being more widely spaced at one end than at the other so that the narrower end of one guide member may overlap and slidingly engage within the wider end of an adjacent guide member, and an outwardly extending strengthening deformation in a side plate portion extending from the wider toward the narrower end of said guide member and terminating short of the overlapping portions of the guide members as they pass around said rotatable supporting member.

3. A guide member for assembly on a crossbar of a flexible endless track movable in a path, said member being arranged for conjoint use with other coacting guide members of like nature, said member comprising a plate generally of H-form and having side portions bent up from a transverse portion into planes generally parallel to said plate, said side portions being more widely spaced at one end than at the other so that the narrower end of one guide member may overlap and slidingly engage within the wider end of an adjacent guide member, and a second plate secured to and reinforcing said first named plate at its wider end and center only.

4. A guide member for assembly on a crossbar of a flexible endless track movable in a path, said member being arranged for conjoint use with other coacting guide members of like nature, said member comprising a plate generally of H-form and having side portions bent up from a transverse portion into planes generally parallel to said path, said side portions being more widely spaced at one end than at the other so that the narrower end of one guide member overlaps and slidingly engages within the wider end of an adjacent guide member but being free of direct connection thereto, a second plate generally of H-form and having side portions bent up from a transverse portion, said side portions being parallel to the side portions of said first named plate at the more widely spaced end and having tongues near the transverse portion extending along said side portions of said first named plate at the narrower end to a point short of the overlapping end of an adjacent guide member, and the side portions of the two plates being welded together.

5. A guide member for assembly on a crossbar of a flexible endless track movable in a path, said member being arranged for conjoint use with other coacting guide members of like nature, said member comprising side plate portions and means for securing the same to a crossbar, said side plate portions comprising a first plate generally parallel to said path, a second plate parallel to said first plate, and a third plate having its peripheral edges bent around said second plate and welded to said first plate.

6. A guide member for assembly on a crossbar of a flexible endless track movable in a path, said member being arranged for conjoint use with other coacting guide members of like nature, said member comprising a base plate generally of H-form having side portions connected by a transverse portion, said transverse portion providing means for attachment of said member to a track crossbar, separate side plate members, one secured to each of said side portions on the outside thereof, said side plate members being generally parallel to said path of movement and being adapted to overlap and engage portions of an adjacent guide member on the endless track, and said base plate being of a metal having characteristics different than said side plate members.

7. A guide member for assembly on a crossbar of a flexible endless track movable in a path, said member being arranged for conjoint use with other coacting guide members of like nature, said member comprising a base plate generally of H-form having side portions connected by a transverse portion, said transverse portion providing means for attachment of said member to a track crossbar, separate side plate members, one secured to each of said side portions on the outside thereof, said side plate members being generally parallel to said path of movement and being adapted to overlap and engage portions of an adjacent guide member on the endless track, said side plate members being formed of a metal having hardening characteristics when heat treated, and said base plate being formed of a metal which remains ductile when subjected to the same heat treatment.

8. A guide member of the class described comprising a base plate generally of H-form and having side portions bent up from a transverse portion into planes generally parallel to each other, said side portions being more widely separated on one side of said transverse portion than on the other, an intermediate plate having portions parallel respectively to said transverse portion and to said more widely separated side portions of said first named plate, two separate side plate members secured one on each side of the assembled base and intermediate plates, and means securing all of said plates together.

EDWIN L. ALLEN.
HAROLD B. MUSTER.